United States Patent [19]

Mraz

[11] Patent Number: 4,842,130
[45] Date of Patent: Jun. 27, 1989

[54] BELT BENDER

[75] Inventor: Dennis Mraz, Saskatoon, Canada

[73] Assignee: D M Enterprises Inc., Saskatoon, Canada

[21] Appl. No.: 757,852

[22] Filed: Jul. 22, 1985

Related U.S. Application Data

[63] Continuation-in-part of Ser. No. 670,563, Nov. 13, 1984, abandoned, which is a continuation-in-part of Ser. No. 640,749, Aug. 14, 1984, abandoned.

[51] Int. Cl.$^4$ .............................................. B65G 47/94
[52] U.S. Cl. ...................... 198/839; 198/806; 198/807; 198/842; 198/861.2; 29/117
[58] Field of Search .............. 198/806, 807, 839, 842, 198/861.2, 303; 29/117; 474/49, 55

[56] References Cited

U.S. PATENT DOCUMENTS

| | | |
|---|---|---|
| 216,696 | 6/1879 | Peaslee . |
| 306,772 | 10/1884 | Pratt et al. . |
| 308,417 | 11/1884 | Layng . |
| 489,323 | 1/1893 | Noble et al. . |
| 795,269 | 7/1905 | Clay . |
| 823,578 | 6/1906 | Bayley . |
| 994,507 | 6/1911 | Fischer . |
| 1,301,507 | 4/1919 | Salisbury . |
| 1,562,237 | 11/1925 | Horner . |
| 1,888,480 | 11/1932 | Storm et al. . |
| 2,128,595 | 8/1938 | Rasmussen ...................... 198/839 X |
| 2,423,407 | 7/1947 | Searles et al. . |
| 2,665,794 | 1/1954 | Slomer .............................. 198/861.2 |
| 2,725,757 | 12/1955 | Murphy . |
| 2,733,806 | 2/1956 | Lanier, Jr. ...................... 198/839 X |
| 2,748,918 | 6/1956 | Mercier .............................. 198/561 |
| 2,761,547 | 9/1956 | Gehrer . |
| 2,873,021 | 2/1959 | McWhorter ..................... 198/839 X |
| 3,078,983 | 2/1963 | Philips .................................. 198/815 |
| 3,545,599 | 12/1970 | Smith et al. . |
| 3,715,027 | 2/1973 | Fujimoto . |
| 3,972,414 | 8/1976 | Conrad . |
| 4,217,981 | 8/1980 | Briggs ................................... 198/839 |
| 4,312,442 | 1/1982 | Temme ................................ 198/561 |

FOREIGN PATENT DOCUMENTS

| | | |
|---|---|---|
| 621342 | 10/1935 | Fed. Rep. of Germany . |
| 1209941 | 1/1966 | Fed. Rep. of Germany ...... 198/806 |
| 1251216 | 9/1967 | Fed. Rep. of Germany ...... 198/839 |
| 575283 | 7/1924 | France . |
| 0028794 | 3/1925 | France ................................. 198/839 |
| 0636388 | 4/1950 | United Kingdom ................ 198/839 |
| 1284745 | 8/1972 | United Kingdom ................ 198/839 |

*Primary Examiner*—Robert J. Spar
*Assistant Examiner*—Lyle Kimms
*Attorney, Agent, or Firm*—Welsh & Katz

[57] ABSTRACT

A belt guidance arrangement for use in a belt conveyor system, such as used in mining operations, includes in one embodiment at least one pair of rollers supported by interconnected frames in vertically spaced substantially horizontal relation so as to enable selective angling between the rollers. An endless conveyor belt is wrapped about the rollers so as to define a reach between the rollers which is twisted generally about a longitudinal twist axis and is subjected to transverse components of tension forces acting on opposite sides of the twist axis upon angled positioning between the rollers. Various embodiments enable the rollers of one or more pairs of rollers to be positioned so that the geometrical relation between the belt engaging peripheral surfaces of the rollers of each pair in the longitudinal direction of belt movement effects balancing of the sum of transverse components of tension forces acting on opposite sides of the longitudinal twist axis of the belt to thereby effect desired training of the belt through the roller pairs. The rollers are preferably formed with profiled configurations which substantially equalize the path lengths of the corresponding longitudinal elements of the belt on opposite sides of the twist axis so as to effect a predetermined differential in the path lengths of the longitudinal belt elements and thereby achieve desired tensile stress distribution in the belt.

30 Claims, 23 Drawing Sheets

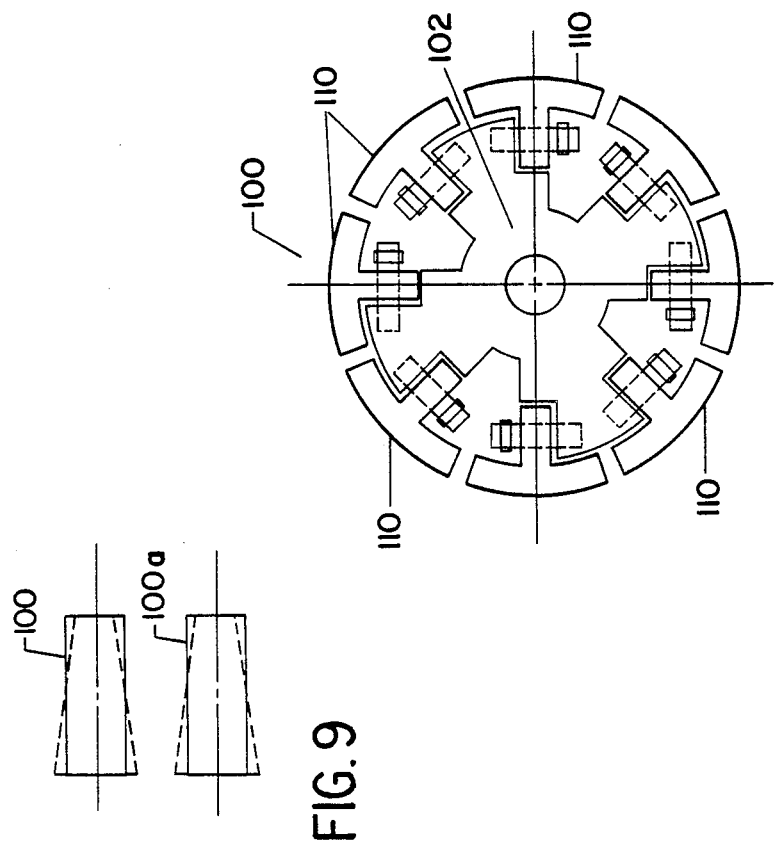

BELT BENDER

This application is a continuation-in-art of my application 670,563 filed Nov. 13, 1984, now abandoned, which is itself a continuation-in-part of my application 640,749 filed Aug. 14, 1984, now abandoned.

BACKGROUND OF THE INVENTION this invention relates to a belt guidance arrangement for use in a conveyor system, such as those used in mining operations.

In mining operations, for example, a mining machine is situated at the mine face and such machine may be expected to mine an arcuate surface of the face, rather than a narrow straightahead surface, and feed its output to a first conveyor stretch directly behind it. Of course, as the mining machine traverses its arcuate path, the first conveyor stretch must follow it and, since such first conveyor stretch must feed its output to a following second stretch of conveyor which has to be maintained in a more or less constant orientation relative to the face, a problem arises as to the minimization of side slippage and wear on the belt as the first conveyor stretch is swung to different positions relative to the second stretch and is expected to continue its normal function.

Indeed, problems are encountered in all situations, i.e. refuse spreading by belt conveyor arrangements, where belt conveyors have to assume a "dog-leg" configuration, particularly configurations of continuously variable angle.

Belt conveying has not generally been considered practical for open pit mines which are either irregular or confined in shape or having relatively steep wall angles, even though costs in many cases could be better than conventional truck haulage.

Optimal overland belt conveyor routes often encounter local natural obstacles such as mountains or bodies of water. The solution usually requires expensive excavation and/or foundation works which reduces the desirability of the technology.

It is the object of the present invention to solve the afore-mentioned problems.

SUMMARY OF THE INVENTION

According to the present invention, a belt guidance arrangement is provided for use in a conveyor system, such as employed in mining operation, which in one emodiment includes at least one pair of guide rollers, and interconnected frames supporting the pair of rollers in vertically spaced relation so as to enable the rollers to be selectively angled generally horizontally relative to each other. An elongated conveyor belt defines an ingoing run to one of the rollers and an outgoing run from the other of the rollers and is wrapped about the rollers to establish a reach therebetween which undergoes twisting generally about a longitudinal twist axis and is thereby subjected to transverse components of tension forces acting on opposite sides of the longitudinal twist axis tending to urge the belt from a predetermined trained relation with the rollers upon horizontal angling therebetween. The rollers are adjusted relative to their respective frames such that the geometrical relation between the belt engaging peripheral surfaces of the rollers in substantially the longitudinal direction of belt movement through at least one of the ingoing and outgoing runs effects balancing of the sum of transverse force components acting on opposite sides of the longitudinal twist axis of the belt to effect training of the belt through the roller pair. In the preferred embodiment, the belt engaging peripheral surfaces of the rollers are formed into profiled configurations which substantially equalize the path lengths of the longitudinal elements of the belt between contact with and release from the rollers on one side of the twist axis with the corresponding longitudinal elements of the belt on the opposite side of the twist axis and effect a predetermined differential in the path lengths of the longitudinal elements of the belt so as to achieve desired tensile stress distribution in the belt.

In carrying out the invention, for example, in a belt angle station, various embodiments employ upper and lower pairs of rollers with one roller of each pair being mounted on a first frame and the other roller of each pair being mounted on a second frame interconnected to and swingable substantially horizontally with respect to the first frame. An elongated conveyor belt defines ingoing and outgoing runs to each pair of rollers and is wrapped about the rollers so as to define a reach between the rollers of each pair which undergoes twisting about a longitudinal twist axis and is thereby subjected to transverse components of tension forces acting on opposite sides of the longitudinal twist axis upon relative positioning between the roller support frames. Means are provided to enable predetermined training of the belt through the various pairs of rollers upon relative angling between the rollers by adjustment of the geometrical relation between the outer peripheral surfaces of the rollers of each pair in the longitudinal direction of belt movement through at least one of the corresponding ingoing and outgoing runs of the belt so as to effect balancing of the sum of transverse components of tension forces acting on opposite sides of the longitudinal twist axis of the belt and thereby maintain desired training of the belt through the roller pairs.

Problems addressed by the present invention are the avoidance of undue stress upon the belt resulting from relative swinging movement, and the maintenance of belt alignment and training of the belt in passing through the rollers.

According to one preferred feature of the invention there is provided a convex roller having a maximum diameter to minimum diameter ratio of about 3:1 and a roller length to maximum diameter of about 5:1.

It is preferred that the means for movable roller adjustment are adapted to adjust the rollers of each pair of rollers by an equal amount towards or away from each other.

Conveniently the static frame and the second frame are constructed as a unit and are mounted for movement as a unit.

DESCRIPTION OF DRAWINGS

Certain embodiments of the present invention will now be described by way of example, with reference to the accompanying drawings, wherein:

FIG. 8 is a detail end elevation of the roller of FIG. 7;

FIG. 9 is a schematic showing a pair of rollers according to FIG. 7;

DETAILED DESCRIPTION

Figure 1:
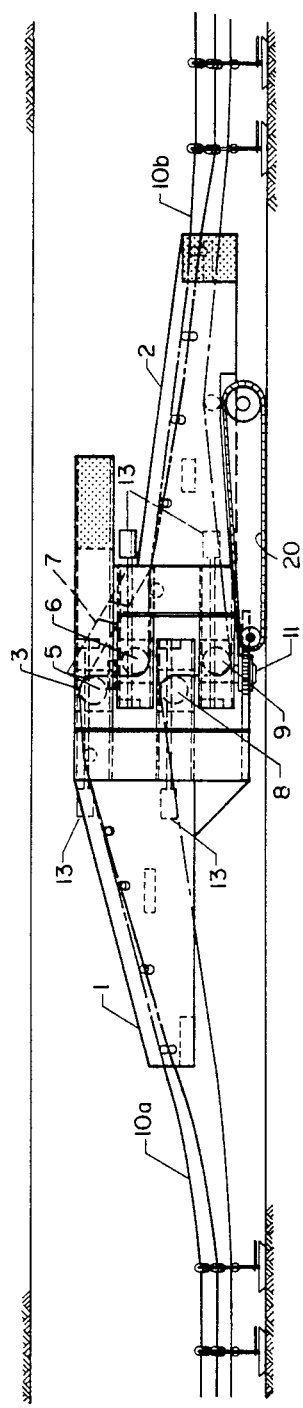
FIG. 1 is a side elevation of a system embodying the present invention.

Referring now to FIG. 1, there is shown a system including a first part 1 which is adapted to be connected to and collect output from, say, a face mining machine, a shovel and crusher combination, or other device, and deliver such output to a second part 2 for delivery eventually to the discharge end of the conveyor to, say, a stacker. The parts 1 and 2 are of suitable design and need not be described in great detail beyond saying that they may conveniently form a unit, as shown in FIG. 1, mounted on crawler tracks, skids, or the like with a suitable chute means 7 spanning the belts 10a, 10b. The present invention is mainly directed to the area of connection 3, between parts 1 and 2 and the following description, therefore, will be largely limited to that area.

Figure 4:
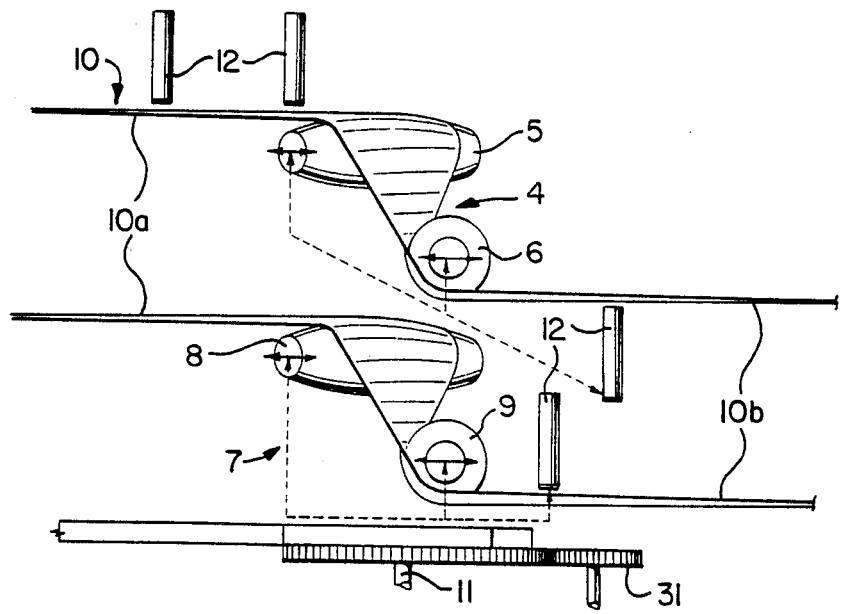
FIG. 4 is a side view corresponding to FIG. 3.

In the area 3, as clearly shown in FIG. 4, there are two pairs of belt bending rollers, pulleys or drums, an upper pair 4, comprising top roller 5 and bottom roller 6, and a lower pair 7, comprising top roller 8 and bottom roller 9, the upper pair 4 guiding the product-carrying run of conveyor belt 10 and the lower pair 7 guiding the return run of the conveyor.

The rollers 6 and 9 are carried by the part 2, which is referred to herein as the "static" part, and the rollers 5 and 8 are carried by the part 1, which is swingable laterally relative to part 2.

Each of the product-carrying run and return run of the belt has a first stretch 10a on part 1 and a second stretch 10b on part 2 and these, of course, move laterally relative to one another as part 1 is swung laterally relative to part 2 about pivot 11 in order to follow the face mining machine. It should be noted that the location of pivot 11 in plan view is the tangency point of the roller pair 5 and 6 and pair 8 and 9 when such rollers are in their normal or non-compensated positions, as with pivot point "p" in FIG. 6. In this regard the part 1 may be dragged through its swing by the mining machine to which it may be attached, or it may be driven, so as to swing about part 2 and follow the mining machine (see FIG. 2), by suitable motors (not shown) on part 2, driving through gearings 31 (FIG. 4). This means that rollers 5 and 8 also swing laterally (since they are mounted on part 1) relative to rollers 6 and 9 on "static" part 2. which would have deleterious stressing and training and alignment effects upon the belt in passing from one roller to another in each pair without provision of the compensation provided by the present invention.

Figure 2:
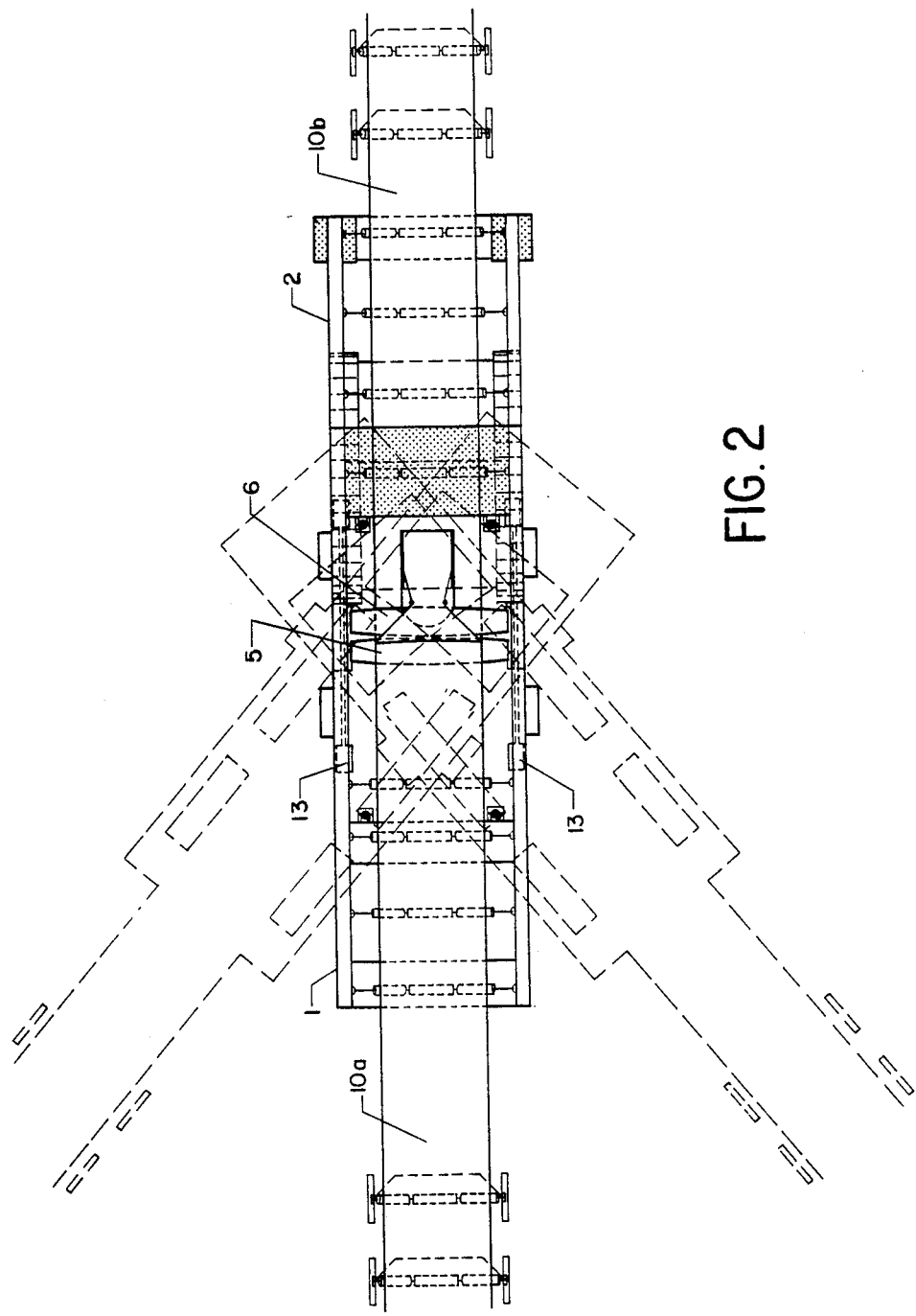
FIG. 2 is a plan view of part of the system shown in FIG. 1.

Such compensation is provided, in the illustrated embodiment, by sensors 12 detecting sidewise slippage of the belt and feeding signals to adjustment mechanisms, such as that shown at 13 in FIG. 2, which moves at least the top roller in each pair longitudinally of the belt to achieve a safe condition once again. Alternatively, of course, the bottom roller could be moved longitudinally, or both rollers could be moved longitudinally, ideally, by equal amounts by manually or automatically operating the adjustment mechanism for each roller of each pair (5,6) (8,9) to move rollers 5,6 and 8,9 through equal distances towards and away from each other. The roller movement results in a variation in the distance alternatively termed the geometrical relation, between external belt engaging roller surfaces of the rollers of each pair longitudinally of the direction of movement of the belt.

Figure 5:
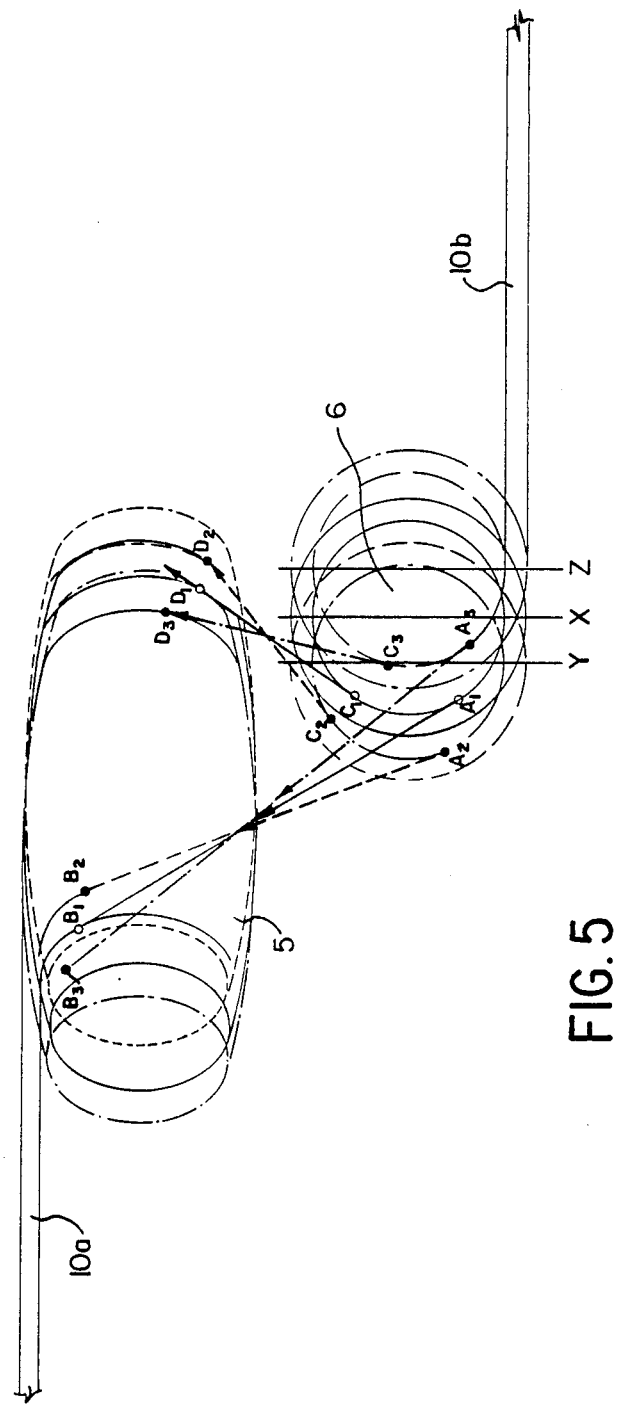
FIG. 5 is a side view of one set of rollers used in guiding and bending the conveyor belt.
Figure 6:
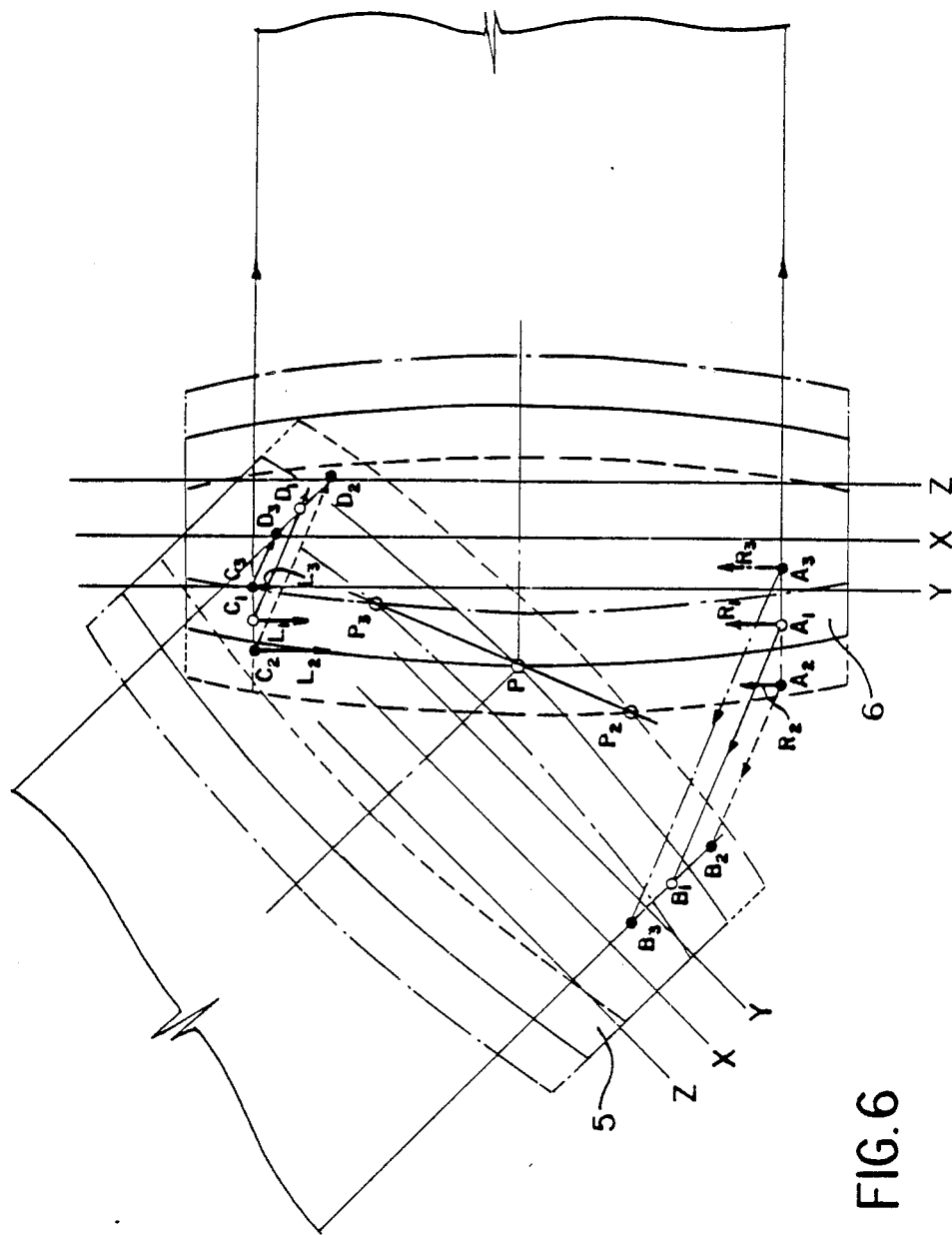
FIG. 6 is a plan view corresponding to FIG. 5.

FIGS. 5 and 6 illustrate the changes which occur in achieving such safe condition in which the belt is safeguarded against excessive side slippage and excessive tensioning and in which belt alignment and training are accomplished. Only the forces relating to roller 6 are shown, as those relating to roller 5 are mirror images of the same. In these Figures the rollers 5 and 6 are so located that, in plan view, the centers of their surface projections normally coincide with pivot point "P" about which part 1 pivots. When part 1 with roller 5 swings about point "P", the longitudinal fiber or element of the belt between roller 5 and 6 coinciding with point "P" is the only one that is vertical. All other longitudinal fibers or elements of the belt are inclined at some angle to vertical and where the rollers of regular cylindrical form, the length of the fibers, and the tension therein, would increase with distance along the length of the rollers from point "P". However the crowning of the rollers offsets this condition. Indeed, the degree of crowning of the rollers can be such as to concentrate the tension forces near the center of the belt and reduce them near the belt extremities. Ideally the crowning profile of the belt rollers will be selected to optimize the path length of individual longitudinal elements in the belt taking into account the variable roller diameter at each element, the vertical spacing of the bend roller pairs, the angle of bend and the equilibrium roller adjustment positions longitudinally of the direction of movement of the belt in compensating for relative swinging movement of the rollers in each bend roller pair. In a practical situation, one would impose a design constraint of, for example, depending upon the construction of the belting, not greater than 5 percent difference in path length from the longest to the shortest belt fiber or element. The resulting profile will usually be convex, but may in fact be a simple radius, parabolic, conical or the like depending upon the desired effect.

The belt will stay in the centered position on the rollers if the sum of all horizontal (transverse) components of tension forces within the belt at each pulley remains equal to zero.

$$\sum_{P}^{C} L_i = \sum_{P}^{A} R_i$$

(Sum of all horizontal tension force components $L_i$ between points "P" and "C" equals to sum of all horizontal tension force components $R_i$ between points "P" and "A")

If the forces on the left side prevail, the belt will move to the right:

$$\sum_{P}^{C} L_i > \sum_{P}^{A} R_i$$

and vice versa:

$$\sum_{P}^{C} R_i < \sum_{P}^{A} R_i$$

As shown in FIGS. 5 and 6, moving rollers 5 and 6 towards each other will increase tension on the left side and decrease tension on the right side of point "P". Moving rollers apart will achieve the opposite effect. Thus, there is a point where the sum of all horizontal (transverse) tension force components within the belt at both rollers equals zero. That is an equilibrium point or point of operation of the present invention. At this point alignment of the belt and the correct training of the belt through the rollers is accomplished.

Figure 6A:
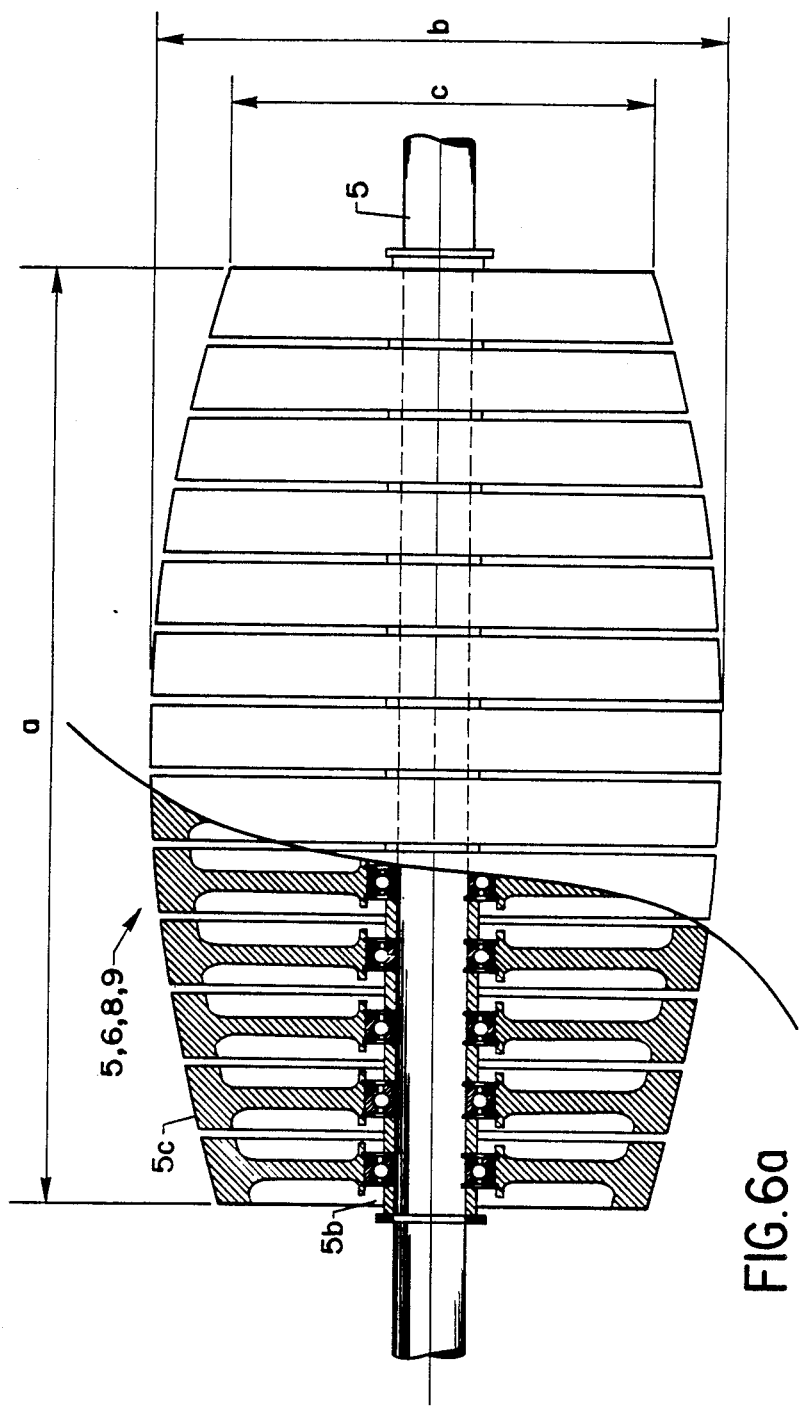
FIG. 6a is a detail partly in section of a segmented roller configuration.

It has been found in tests, that a segmented pulley such as that shown in FIG. 6a gives good results and provides for a swing of part 1 of about 50° either side of the center line or part 2. Each segment 5a of the pulley 5, 6, 8 or 9 of FIG. 6a has its own bearing 5b mounting on a common shaft 5c and by making the pulley (or roller, or drum) 5, 6, 8 or 9 or, say, 6" small diameter (dimension c in FIG. 6a) and, say, 18" large diameter (dimension b in FIG. 6a), and with a longitudinal dimension of between say 6 feet to 7½ feet (dimension a in FIG. 6a) a good vertical spacing between rollers 5 and 6 and 8 and 9 can be achieved and this has beneficial results on the angle of swing of rollers 5 and 8. It is anticipated that in low coal seams with restricted headroom the roller pairs may have to be moved vertically closer together than would be normally considered optimum (a center spacing of about two roller maximum diameters) and the angle of swing of part 2 may be then restricted somewhat, but an angle of 40°–45° either side of center is expected in most conditions and more in ideal conditions. The segmented pulleys of FIG. 6a have low friction with the flexible belts passing thereover and once the sensors 12 have caused the pulley pairs to be moved together or away from each other, to achieve equilibrium for a given condition, the controls become largely inactive.

In the embodiment of the invention as described with respect to FIGS. 1 to 4 the distance or geometrical relation between the external belt engaging roller surfaces is varied by adjusting the positions of the roller centers longitudinally of the direction of movement of the belt. In FIGS. 7 to 10 an alternative embodiment is shown. In this embodiment pairs of conical rollers 100, 100a (FIG. 9) are employed in place of rollers 5, 6; 8,9 and in place of a mounting means capable of longitudinally moving the roller centers, means is provided for producing variable conicity of the rollers to vary the distance or geometrical relation between external roller surfaces.

Figure 7:
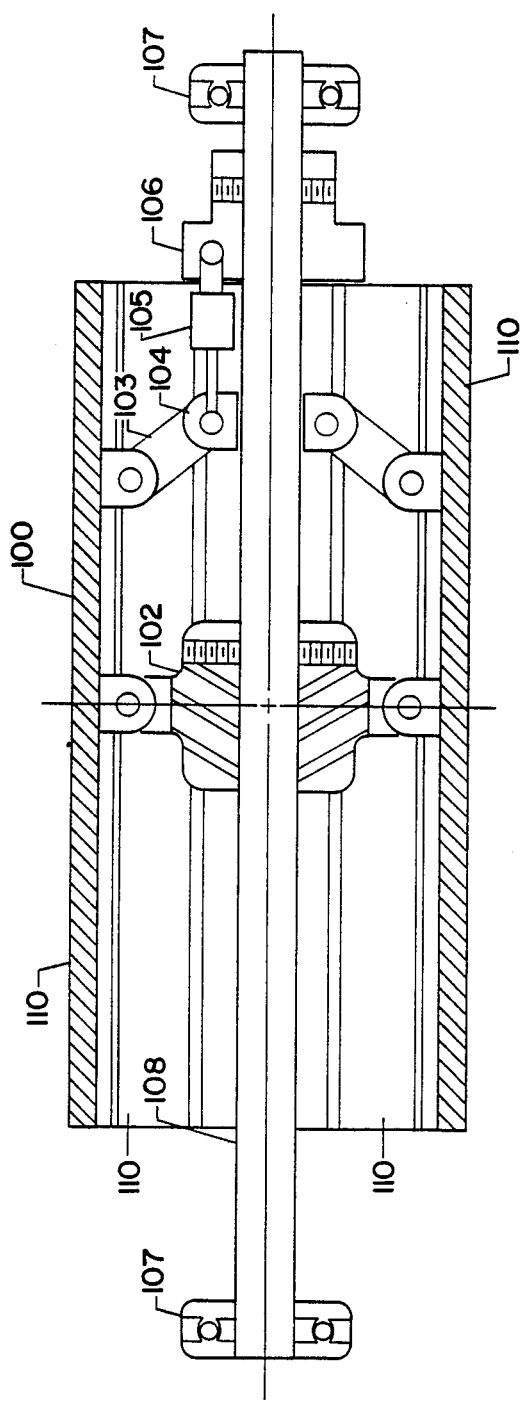
FIG. 7 is a cross-sectional detail of an alternative embodiment showing a conical roller of varying conicity.
Figure 10:
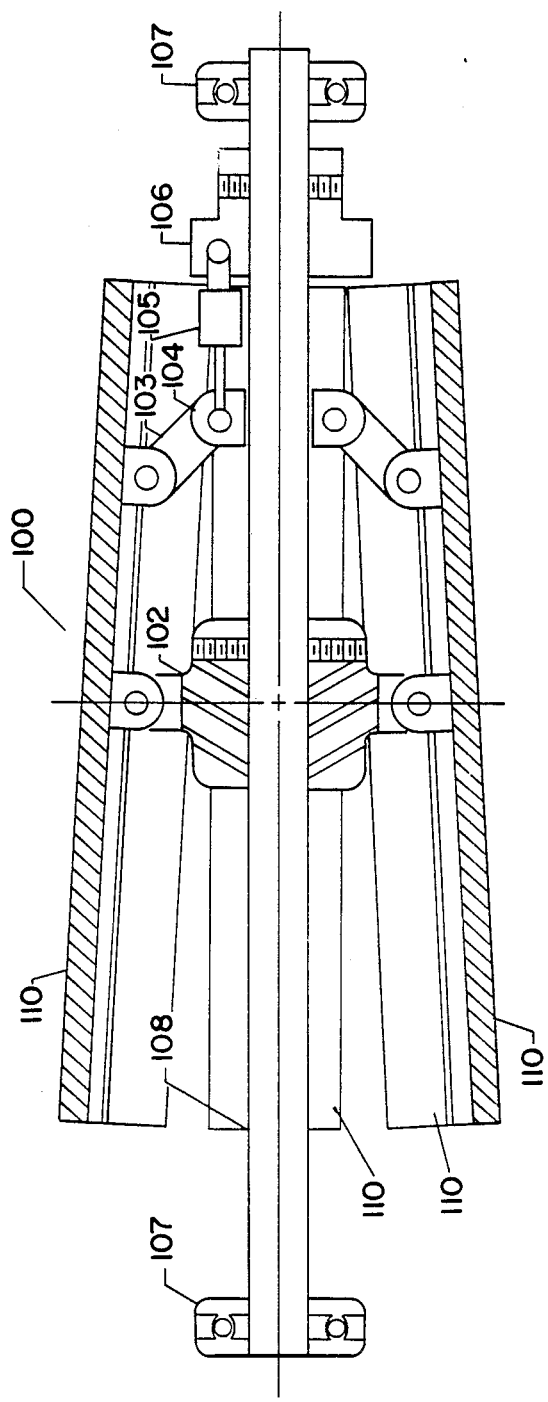
FIG. 10 is a detail similar to FIG. 7 but with the cone shape more pronounced.

Rollers 100, 100a are (as best seen in FIG. 7, 8 and 10) made up of a series of elements 110 extending longitudinally of the rollers. These elements 110 are pivotally mounted on spider 102 and connected to laterally slidable sleeve 104 by linkage 103. Actuator 105 mounted to collar 106 is arranged to move sleeve 104 either to the right or to the left such as to tilt all drum surface elements 110 equally and simultaneously, thus achieving conicity of the drum surface (see FIGS. 7 and 10). The principle effect of coning each roller of a roller pair is to increase its circumferential dimension, say, at the left side with a corresponding decrease at the right side, generating proportionally variable tensions in the belt fibres. As in the previous embodiments the actuator 105 would control conicity only to vary the distance between external roller surfaces of the rollers of each pair to provide balancing horizontal (transverse) tension components within the belt at the drum, or roller. Actuator 105 could, if desired, be arranged to respond to sensors 12 (Fig. 3).

Figure 3:
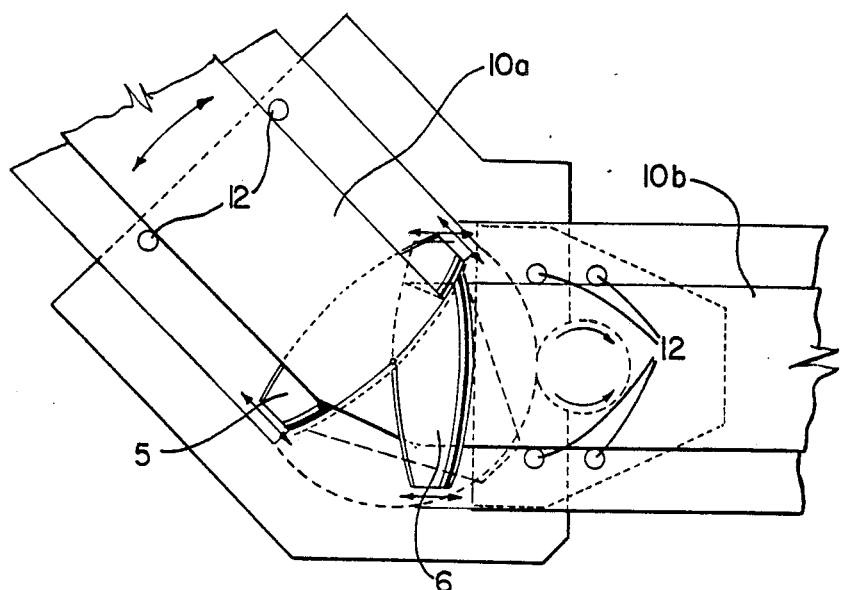
FIG. 3 is a detail plan view of the transition between the first and second stretches of the conveyor belt.
Figure 11:
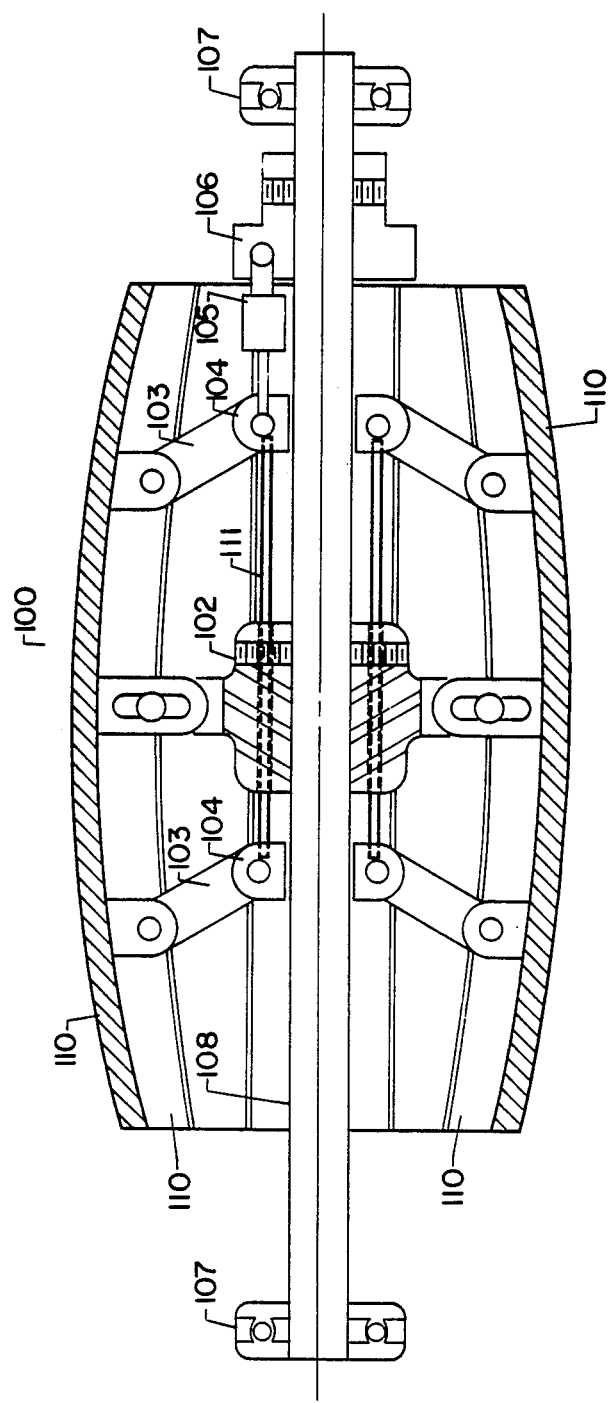
FIG. 11 is a detail of another embodiment of the invention showing a roller of similar shape to those of FIGS. 3 and 4.

A further alternative is seen in FIG. 11 which is a view similar to FIG. 7, and which shows the roller 5 or 6; or 8 or 9, preferably having an external contour as seen in FIGS. 3 and 4 arranged so that instead of being mounted with roller centers adjustable longitudinally of the direction of movement of the belt, as in FIGS. 1 to 4, a linkage arrangement is provided to move the roller elements 110 outwardly or inwardly to increase or decrease the roller outside diameter and in this fashion vary the distance or geometrical relation between the external roller surfaces of the rollers of each pair. Preferably, rollers 5, 6, 8 and 9 are all similarly provided and preferbly also, means is provided to respond to signals from the sensors 12 to automatically alter roller diameters.

Figure 12:
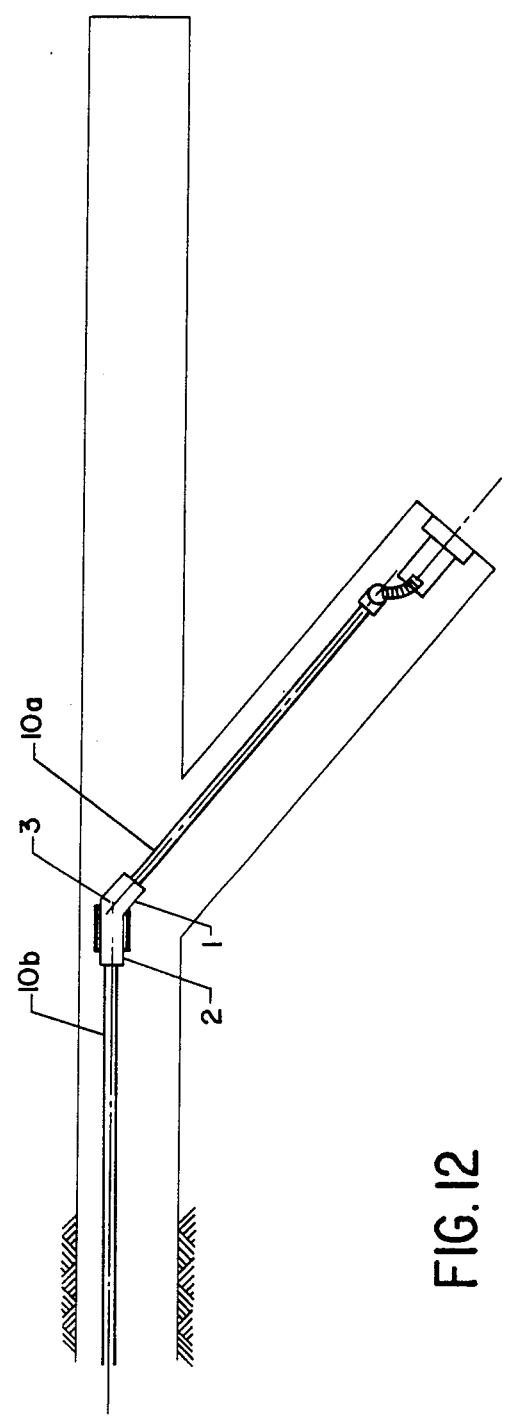
FIGS. 12, 13 and 14 are examples of various systems embodying the present invention.
Figure 13:
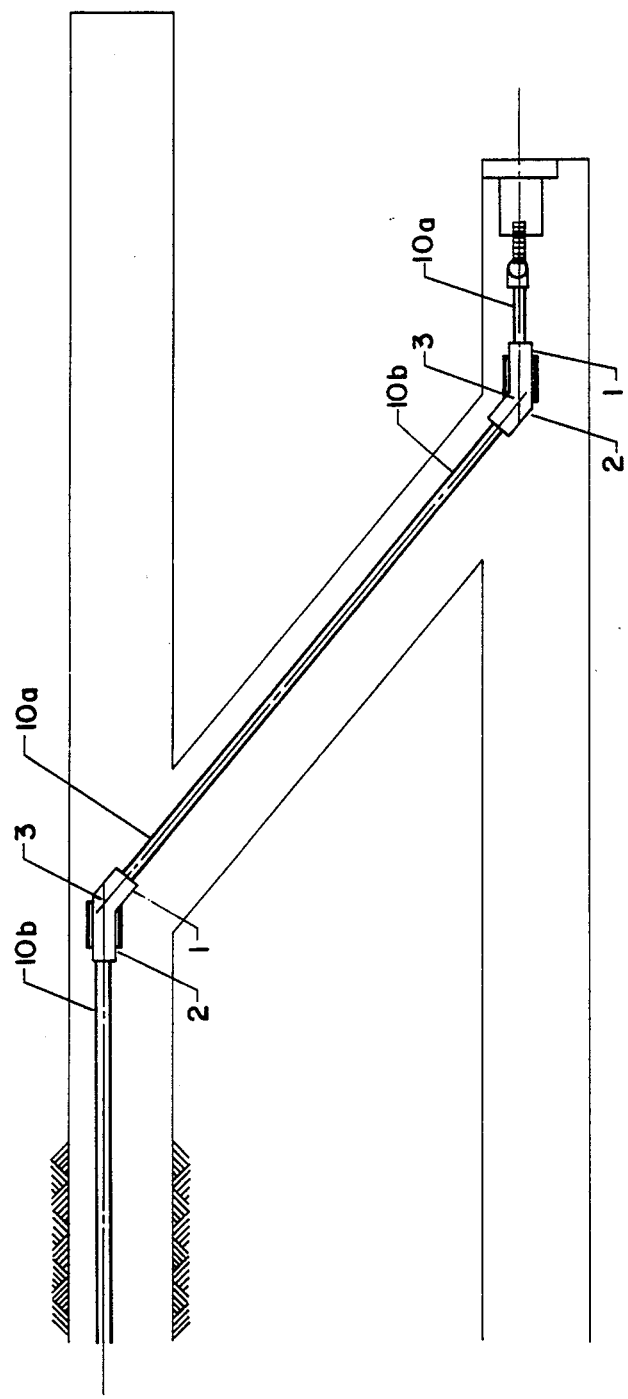
Figure 14:
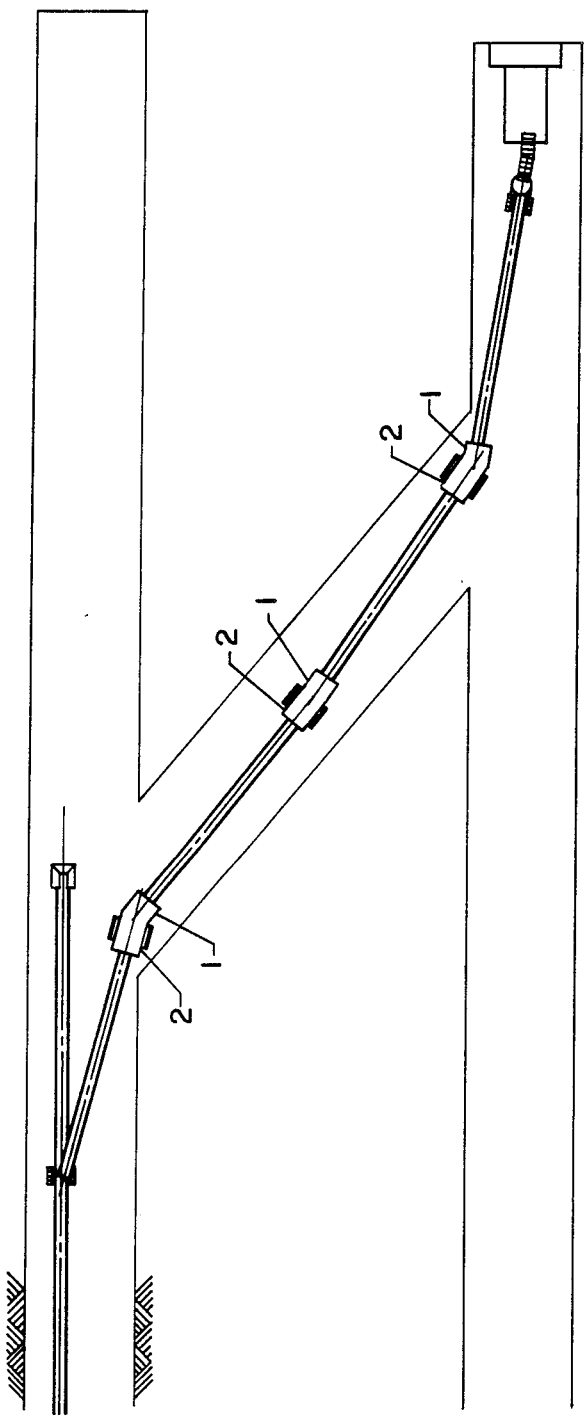

FIGS. 12, 13 and 14 show schematically the invention utilized in different systems operating behind a face mining machine or the like. The invention is equally applicable to convey products from, say, an in-pit semimobile crusher, in which the conveyor ramps out of the pit on a convenient segmental spiral pattern as shown in FIG. 15.

Figure 15:
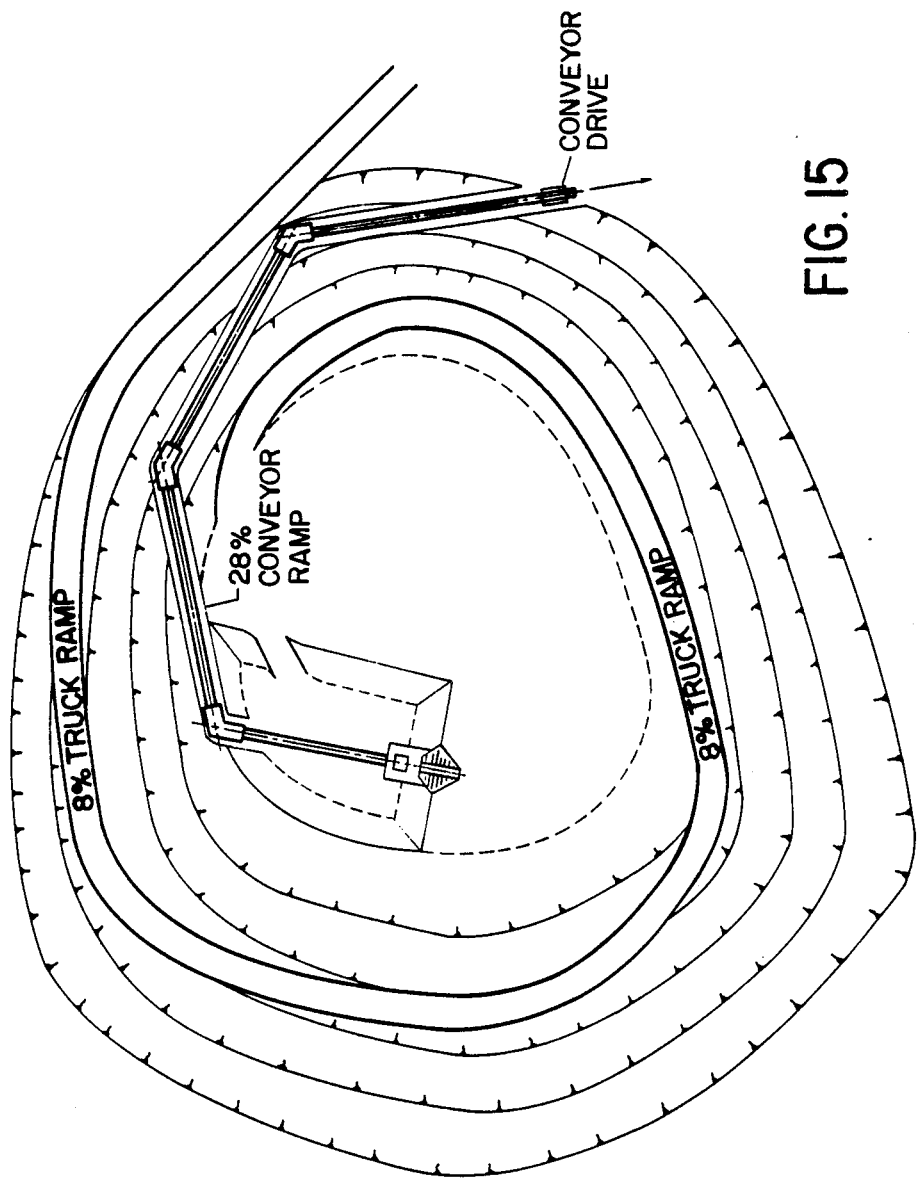
FIG. 15 is a schematic representation of the invention in use in a constricted open pit.

As can be seen in FIG. 15 it is obvious that by consecutive application of the principles of the invention, any angle up to 360° and beyond can be turned. It will be equally obvious that serpentine angles to either side can be turned within one conveyor flight.

It will be clear that the invention is also applicable to conditions in which the static and swingable frames 2, 1 are mounted at a fixed angle for relatively long periods of time.

Figure 16:
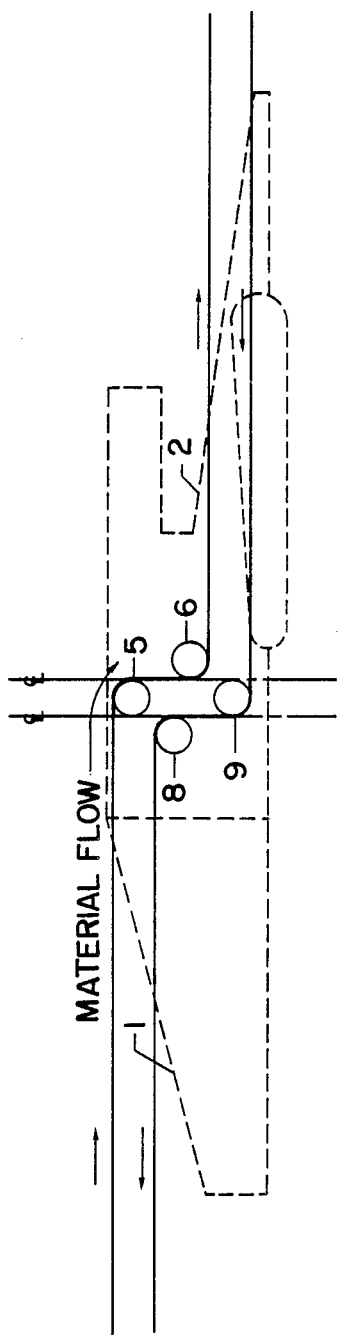
FIG. 16 is a schematic side elevation of the invention configured for a low headroom application.

In some applications, where headroom is severely restricted, for example low seam underground conveying, the upper and lower pairs of rollers 5,6 and 8,9 may be displaced longitudinally (see FIG. 16) with respect to one another and to pivot about their individual pivot axes for bend roller pairs (shown as center lines) and their mountings modified to accommodate for the repositioning.

Figure 17:
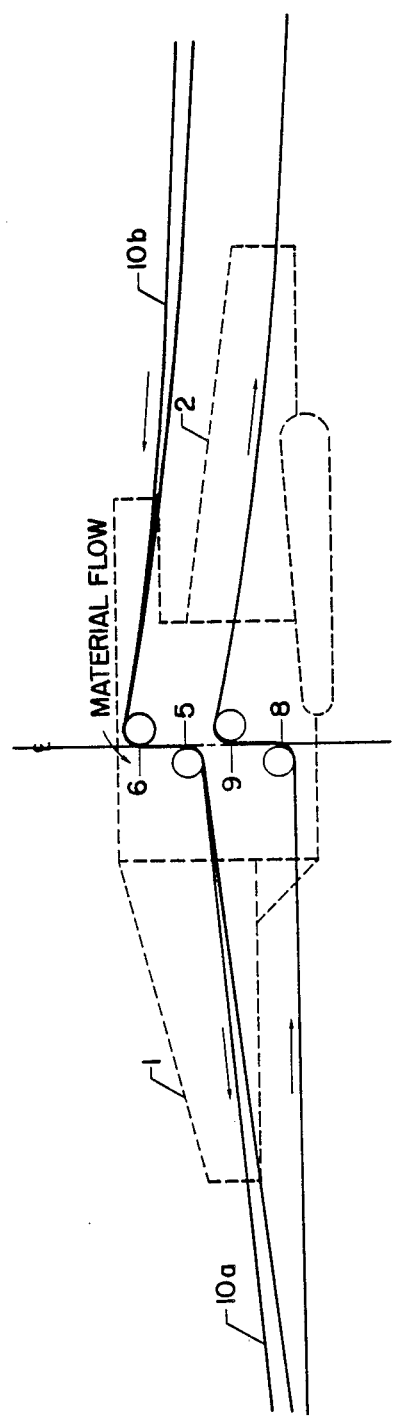
FIG. 17 is a schematic side elevation of a system embodying the invention, conveying in the reverse direction to that of FIG. 1.
Figure 18:
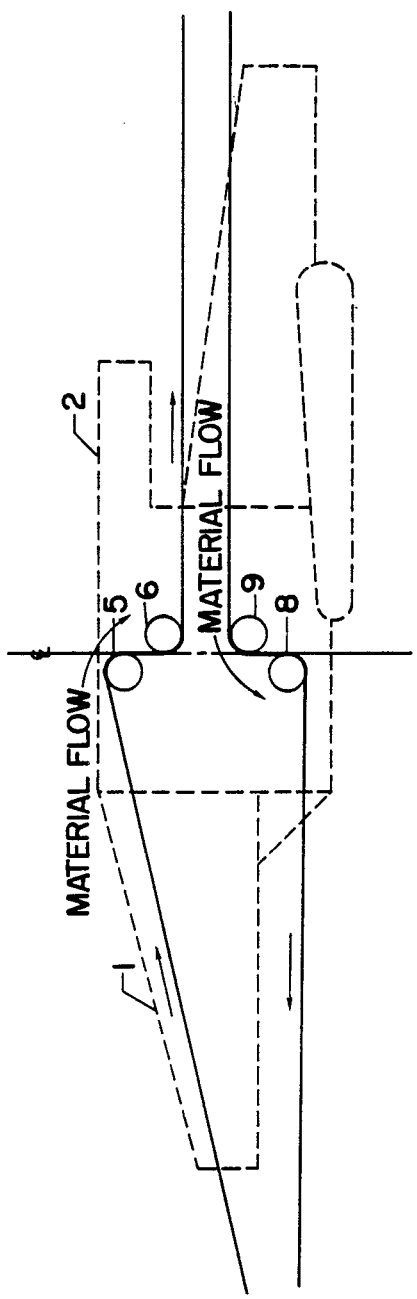
FIG. 18 is a schematic side elevation of a system embodying the invention arranged for conveying material in both directions simultaneously.
Figure 19:
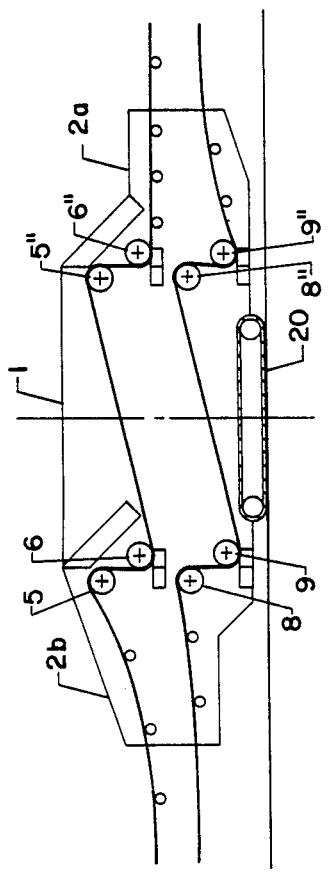
FIGS. 19 and 20 are schematic side elevation and plan view of an arrangement similar to FIGS. 1 and 2 but with a further swingable frame.
Figure 20:
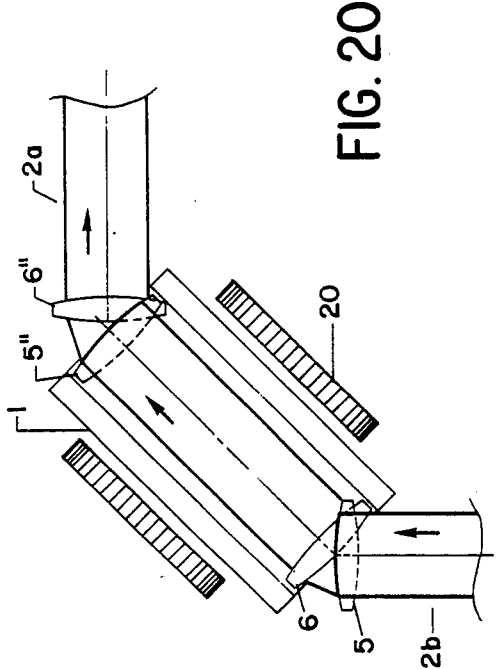

FIG. 17 shows an embodiment in which conveying is effected in the reverse direction to that of FIG. 1 and FIG. 18 shows an embodiment in which material is conveyed in both directions simultaneously. FIGS. 19 and 20 illustrate a mobile belt bending machine for up to 90° angles in which two swingable portions 2a and 2b are mounted to the central fixed frame 1 which is mobile by means of tracks 20. All other details including compensation means for roller pairs are as previously described.

Figure 21:
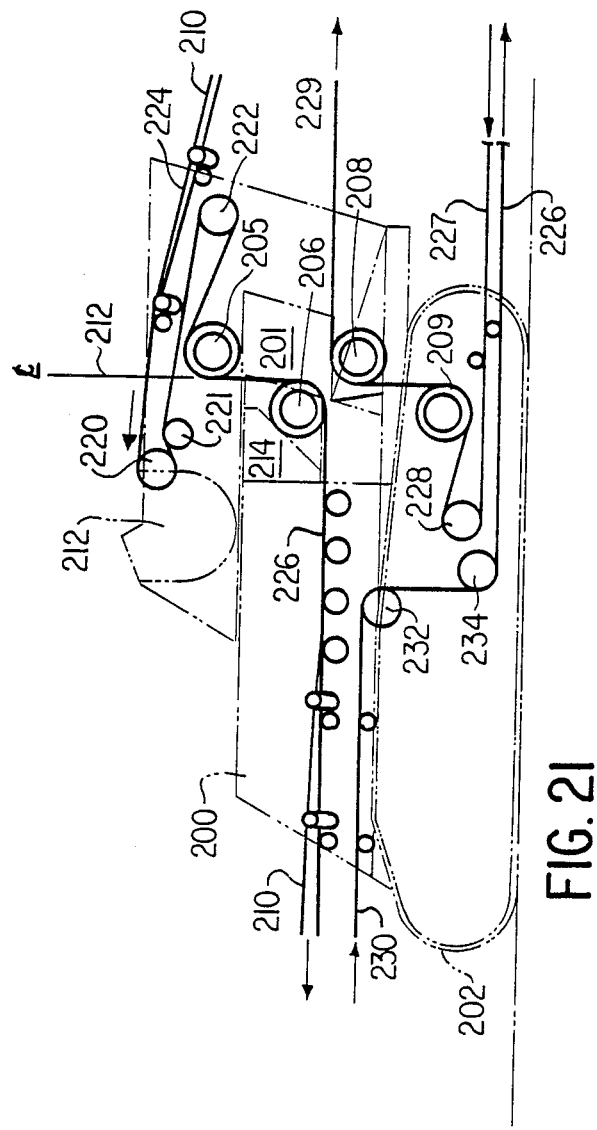
FIG. 21 is a view similar to FIG. 1 but with modifications for the transfer of material and for the mounting of the belt bending device.

In FIG. 21, a belt bending arrangement comprising a frame 200 mounted for movement on endless tracks 202 carries a swingable frame 201 mounted for swinging in the horizontal plane with respect to the frame 200. Two pairs of belt bending rollers 205, 206 and 208, 209 are provided to bend the conveyor belt 210 through an angle of up to, say, 45° (see FIG. 22). The frame 201 pivots about its pivot center line 212 and carries the pulley 205 of the pulley pair 205, 206 and the pulley 208 of the pulley pair 208, 209 so that pulleys pivot with respect to their pair 206 and 209. As in all preceding configurations means is provided to vary the distance between the external roller surfaces of the pair 205, 206 and of the pair 208, 209, longitudinally of the direction of movement of the belt 210 to compensate for the relative swinging movement of the rollers 205, 208 relative to the other half of their pairs 206, 209. This can conveniently be done by moving at least one or the other of each pair longitudinally of the direction of movement of the belt by a suitable arrangement on either one or both of the frames 200, 201.

The swingable frame 201 overhangs in cantilever fashion behind the frame 200 and carries the chute 212 of a hopper arrangement 214. Additionally the swinging frame 201 carries conveyed material transfer pulley system 220, 221, 222 over which the incoming material carrying belt run 224 of the belt 210 passes. Material coming from the right hand side of the Figure on the belt 210 arrives at the belt bending arrangement and the incoming run 224 passes over the first 220 of the pulleys of the transfer system and discharges the conveyed material into the chute 212 of the hopper 214. The run 224 having passed around the pulley 222 then enters the belt bending arrangement and passes over the bending pulleys 205, 206 to provide an outgoing run 226 which is a continuation of the incoming belt run 224. The hopper 214 feeds the material transferred into its chute 212 back onto the outgoing run 226 of the belt 210 which then proceeds to the left for discharge. The return run 230 of the belt 210 passes through frame 200 over rollers 232, 234 from where a run 226 proceeds to a conventional tail pulley remote from the belt bending arrangement. The run 227 returns from the tail pulley passes over a pulley 228 on the frame 200 and then over the bending roller pair 209, 208 where it returns along a run 229 to a second remote tail pulley mounted for longitudinal and/or transverse motions suitable to the application.

Figure 22:
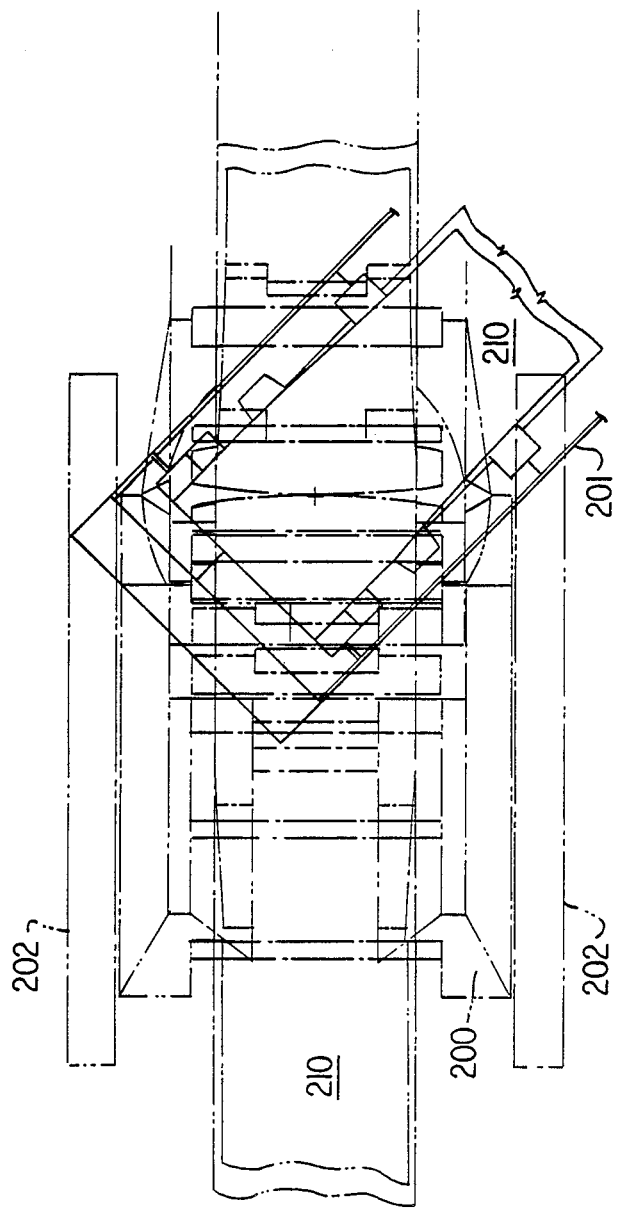
FIG. 22 is a plan view of the device seen in FIG. 21.

It will be clear from this description that the belt bending arrangement of FIGS. 21 and 22 may readily be inserted into an existing conveyor belt system to enable bending of that system conveniently at horizontal angles of up to 45°.

Referring now to FIGS. 23 through 26, FIGS. 23 and 24 show schematically an alternative arrangement to that shown in FIGS. 19 and 20 and suitable for use in situations where head room is limited and where horizontal bend angles of up to 90° will be required.

A frame 300 is movably mounted on endless tracks 302 and has a swingable second frame 301 mounted thereon for swinging movement in a horizontal plane thereto. The second frame 301, in its turn has a further frame 302 mounted thereon for swinging thereabout in a horizontal plane (see FIG. 24).

Figure 23:
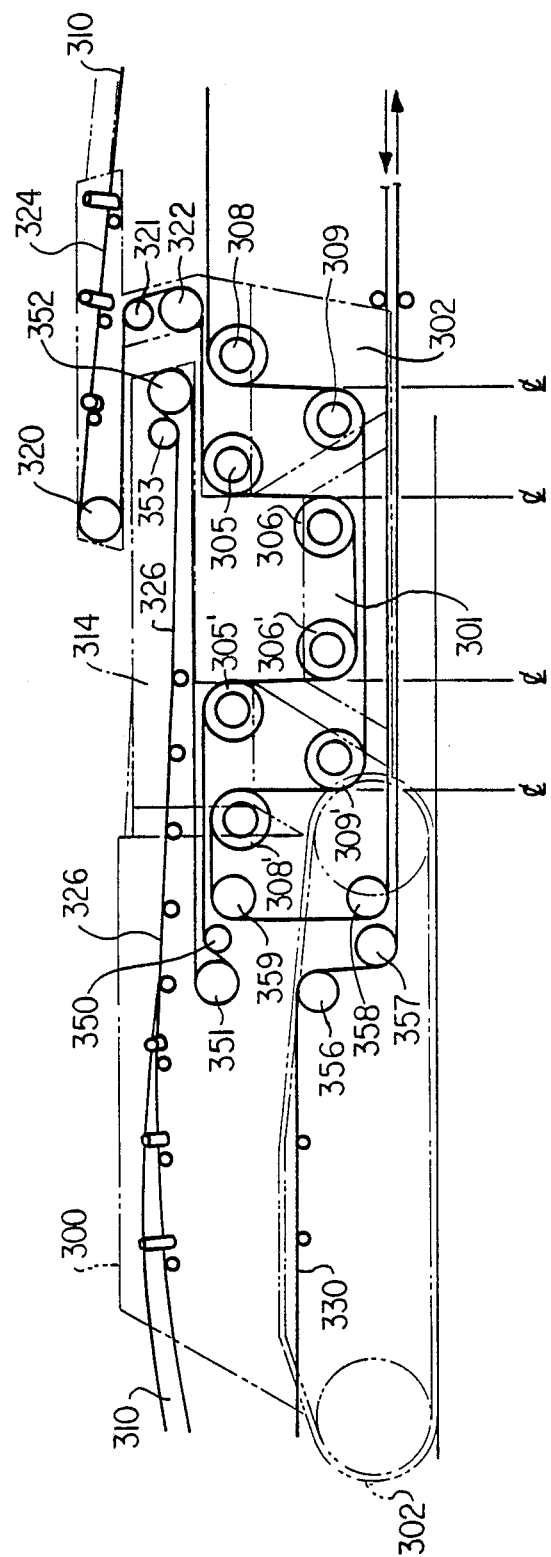
FIG. 23 is schematic side elevation of an embodiment similar to FIG. 19 but for operation in a low head room situation and incorporating some of the other modifications seen in FIG. 21.
Figure 24:
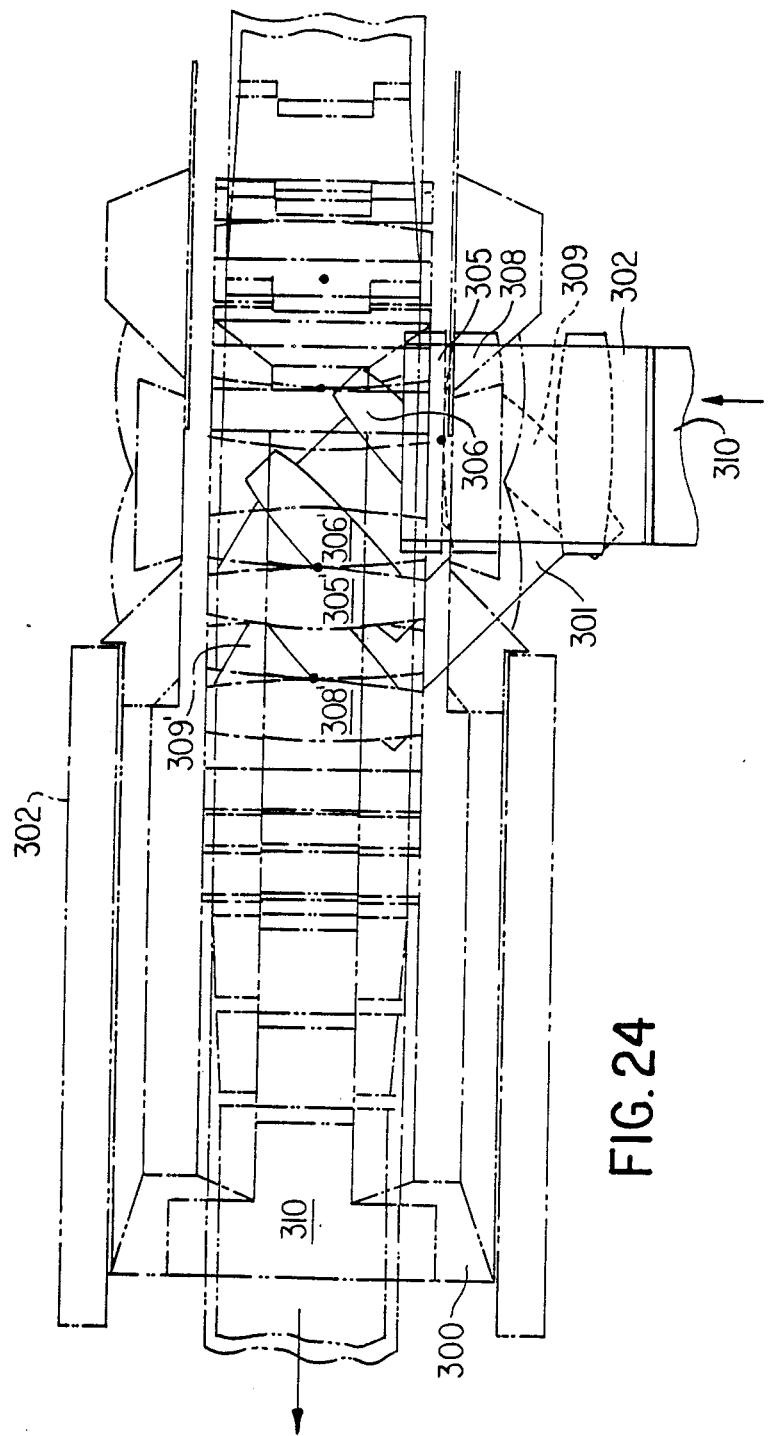
FIG. 24 is a plan view of the configuration seen in FIG. 23.

The frame 302 carries roller 305 of roller pair 305, 306 and roller 308 of roller pair 308, 309 so that the rollers 305, 308 may rotate relative to the other half of their pairs 306, 309 respectively. The frame 301 carries the rollers 309, 306 and additionally carries the roller 306' of the roller pair 305', 306' and the roller 309' of the roller pair 309', 308' so that rollers 306', 309' may rotate relatively to the other halves of their roller pairs 305', 308'. 305' and 308' are carried on frame 300. As before it is to be understood that means is provided to vary the distance between the external roller surfaces of the rollers of each of the pairs in the system, longitudinally of the direction of movement of the belt to compensate for relative swinging movement of the rollers of each pair. Conveniently this may be accomplished by providing means for adjusting movement longitudinally of the direction of belt movement of at least one or the other of each of said pairs. To this end suitable mountings may be provided on one or both of frames 300, 301 or one or both of frames 301, 302. The center line of pivot of the rollers 305, 306; 308, 309; 305', 306' and 308', 309' are shown as such. It is understood that one skilled in the art could design other structural frame arrangements than frames 300, 301 and 302 which would still satisfy the geometrical relationships of the bending roller pairs and the incoming and outgoing runs of belting. In operation conveyed material moving from right to left as seen in FIG. 23 provides an incoming carrying belt run 324 which enters a conveyed material transfer pulley system 320, 321, 322, the material being discharged from the belt run 324 close to the pulley 320 into a hopper 314. The belt run 324 has a substantially flat section near the transfer pulley 320 and this section is suitable to mount belt cleaning scrapers or cleaners. A spiral self-cleaning roller could be provided at the bend position to further clean the belt. This cleaning is important where wet or sticky materials are being handled and serves to clean the belt before entering the bending rollers 305, 306. The belt passes around roller 322, and then over the bending rollers 305, 306 where it is bent through an angle of, say up to 45° about the pivot axis. The belt then passes over the roller 306' and over the roller 305' and is bent through a further, say 45° about the pivot axis of the pulley 306', 305'. After that the belt passes over pulleys 350, 351, 352, and 353 to provide an outgoing belt run 326 which is of course a continuation of the incoming belt 324. Material from the hopper 314 is deposited on outgoing belt run 326 which proceeds from right to left clear of the frame 300 and on to a remote discharge point. The return belt run 330 enters the frame 300 and passes over rollers 356, 357 and out to the right (as seen in FIG. 23) to a conventional tail section where it is reversed and returned to the belt bending arrangement. The belt passes over the rollers 358 and 359 to the belt bending roller pairs 308' and 309' where it undergoes an up to 45° bend about the pivot axis of the rollers 308', 309' and after proceeding through rollers 309, 308 it experiences a further bend of up to 45° about the pivot axis of rollers 308, 309. From thence it passes to the right (as seen in FIG. 23) to a second remote tail pulley. In FIG. 24 it will be seen that the belt 310 passes through a full 90° turn from where it enters the belt bender arrangement from the bottom of the page as seen in FIG. 24 out to the left.

It is clear that the belting runs to the conventional tail pulley are enabled by the pulley combinaton 356, 357 and 358, 359 which deflect the return run 330 under the belt bending machine to the remote tail pulley location and receive it back into the belt bending machine again prior to entering the first belt bending roller 308, for the return run. In some applications, it will be advantageous to omit pulleys 356, 357 and 358, 359 providing only such deflection pulleys as will be required to enable belting run 330 to enter the first belt bending roller 308' directly from the left side of the figure. In such a case, the ground loop and conventional tail pulley do not exist; only the remote auxiliary tail pulley associated with the loading point of belting run 324 will be used.

Figure 25:
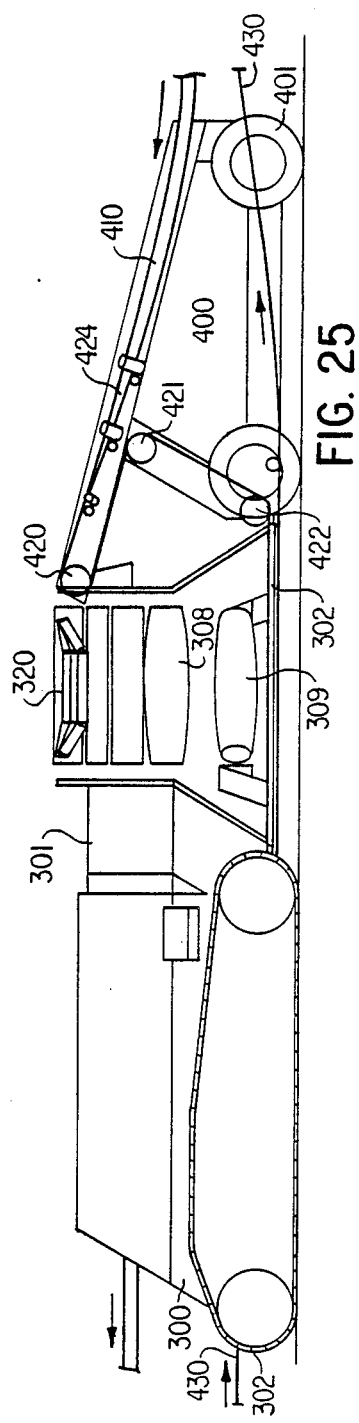
FIG. 25 is a view of a configuration similar to FIG. 23 but with an additional feed from a ground loop being provided via a trip car.
Figure 26:
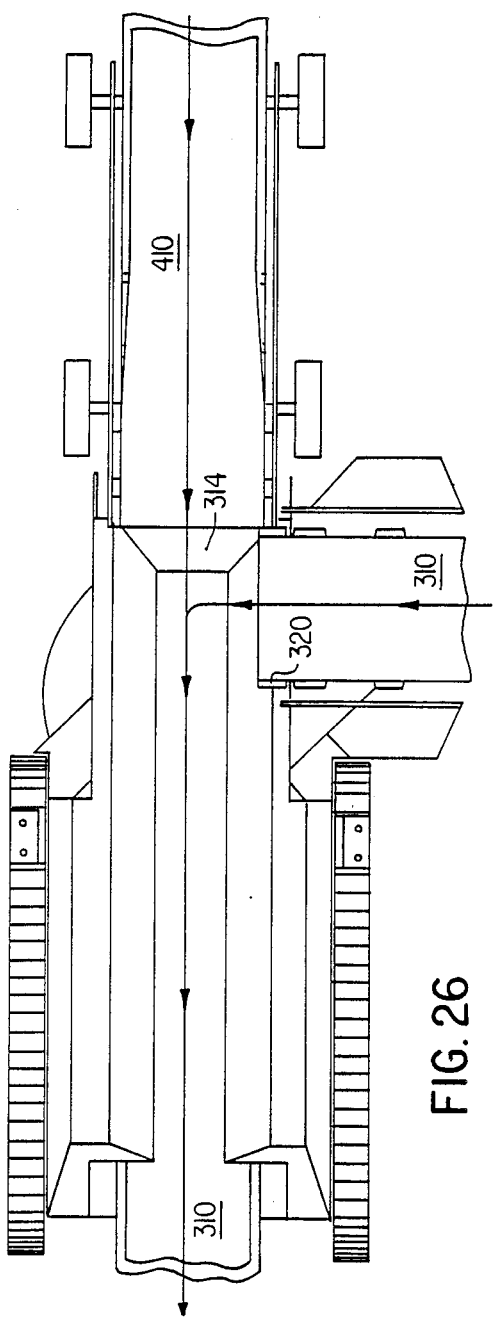
FIG. 26 is a plan view of the configuration shown in FIG. 25.

In FIGS. 25 and 26 there is shown an arrangement where the embodiment according to FIGS. 23 and 24 may be used with an existing group loop system to provide for an additional input to the system along the line of the original conveyor. A trip car 400 mounted on wheels 401 provides for material conveyed on the belt 410 to be carried through a material transfer run 424 which passes over a transfer pulley system 420, 421 and 422 to discharge material into the hopper 314 adjacent the roller 320. Thereafter material from both the belt 410 and the belt 310, before it turns through the right angle to the left as seen in FIG. 26 is conveyed on the belt 310 for discharge. The belt 410 after passing through the pulleys 420, 421 and 422 moves from right to left and thereafter enters pulleys 358 and 359 of the belt bending machine as shown in FIG. 23.

The novelty of the arrangement of FIGS. 25 and 26 is seen particularly in that on one continuous conveyor flight there is provided independent means to load output from, for example, two mining machines for combined ore transportation to the discharge point, at least one of such mining machines operating in a remote location in a horizontal sense from the centre line of the conveyor system.

What I claim as my invention is:

1. For use in a conveyor system such as employed in mining operations, a belt guidance arrangement comprising at least one pair of vertically spaced rollers, one of said rollers being mounted on a first frame and the other roller being mounted on a second frame swingable horizontally relative to said first frame, an endless belt wrapped about said pair of rollers so as to define a reach between said rollers which undergoes twisting generally about a longitudinal twist axis and is thereby subjected to transverse components of tension forces acting on opposite sides of said longitudinal twist axis upon horizontal swinging movement of said second frame relative to said first frame, means for mounting each of said rollers to be adjustable longitudinally of the direction of movement of the belt so as to balance the sum of the transverse components of tension forces acting on opposite sides of said longitudinal twist axis and thereby maintain stable training of the belt about said rollers.

2. A belt guidance arrangement as defined in claim 1 including means adapted to adjust each roller of said pair by an equal amount toward or away from the other.

3. For use in a conveyor system such as employed in mining operations, a belt guidance arrangement comprising at least one pair of vertically spaced rollers, one of said rollers being mounted on a first frame and the other roller being mounted on a second frame swingable horizontally relative to said first frame, an endless belt wrapped about said pair of rollers so as to define a reach between said rollers which undergoes twisting generally about a longitudinal twist axis and is thereby subjected to transverse components of tension forces acting on opposite sides of said longitudinal twist axis upon horizontal swinging movement of said second frame relative to said first frame, means for mounting at least one of said rollers for movement longitudinally of the direction of movement of the belt so as to balance the sum of the transverse components of tension forces acting on opposite sides of said twist axis and thereby maintain stable training of the belt about said rollers, each of said rollers being convex in configuration and having a maximum diameter to minimum diameter ratio of about 3:1 and a length to maximum diameter ratio of about 5:1.

4. A belt guidance arrangement comprising, in combination, at least one pair of rollers, first and second interconnected frames supporting said rollers in vertically spaced substantially horizontal relation so as to enable said rollers to be swingably substantially horizontally relative to each other, an elongated conveyor belt having individual longitudinal elements and defining an ingoing run to one of said rollers and an outgoing run from the other of said rollers, said belt being wrapped about said rollers so as to define a reach therebetween which is twisted generally about a longitudinal twist axis and is thereby subjected to transverse components of tension forces acting on opposite sides of said longitudinal twist axis when said belt is turned through an angle by relative swinging movement between said rollers, means mounting said rollers for movement relative to their respective frames in the longitudinal direction of movement of the belt such that the geometrical relation between the belt engaging peripheral surfaces of said rollers effects balancing of the sum of the transverse components of tension forces acting on opposite sides of said longitudinal twist axis of said belt, said belt engaging peripheral surfaces of said rollers defining profiled configurations which substantially equalize the path lengths of said individual longitudinal elements in the belt between contact with and release from said rollers on one side of said twist axis with the corresponding longitudinal belt elements on the opposite side of said twist axis and effect a predetermined differential in said path lengths from the longest to the shortest longitudinal elements of the belt so as to effect a desired tensile stress distribution in the belt.

5. A belt guidance arrangemnet as defined in claim 4 wherein the roller surfaces of said pair of rollers are configured to effect a path length differential of not greater than 5% between the longest and shortest longitudinal elements of said belt as it passes between said pair of rollers.

6. A conveyor belt guidance arrangement comprising, in combination, at least one pair of rollers, first and second interconnected frames supporting said rollers in vertically spaced relation and enabling said rollers to be swingable substantially horizontally relative to each other, an elongated conveyor belt defining an ingoing conveying run to one of said rollers and an outgoing conveying run from the other of said rollers and being wrapped about said rollers so as to define a reach therebetween which is twisted generally about a longitudinal twist axis and is thereby subjected to transverse components of tension forces acting on opposite sides of said longitudinal twist axis when said belt is turned through an angle by relative angular movement between said rollers, means for mounting at least one of said rollers for adjustment relative to its respective frame in substantially the longitudinal direction of movement of the belt such that the geometrical relation between the belt engaging peripheral surfaces of said rollers effects balancing of the sum of transverse components of tension forces acting on opposite sides of said longitudinal twist axis of said belt and thereby effects training of the belt through the roller pair.

7. A belt guidance arrangement as defined in claim 6 wherein the longitudinal centers of said rollers are spaced apart a distance of about two roller maximum diameters.

8. A belt guidance arrangement as defined in claim 6 wherein at least one of said rollers is segmented and includes means enabling outward generally radial adjustment of the segments to vary the outer radial dimension of the outer peripheral surface of said one roller so as to selectively adjust the spacing between the outer peripheral surface of said rollers in the longitudinal direction of belt movement.

9. A belt guidance arrangement as defined in claim 6 including means for increasing and decreasing the outside diameter of said one of said rollers.

10. Apparatus as claimed in claim 6 further including hopper means extending above said first and second frames and operative to receive conveyed material to transfer conveyed material to said hopper means from said ingoing conveying run prior to said ingoing conveying run passing between said rollers, said hopper means being located relative to said outgoing conveying run so as to return conveyed material to said outgoing belt run from said hopper means.

11. A belt guidance arrangement as defined in claim 6 in which the outer peripheral surface of each roller is convex.

12. A belt guidance arrangement as defined in claim 6 including a second pair of vertically spaced belt bending rollers, one of said rollers of said second pair being mounted on said first frame and the other roller of said second pair being mounted on said second frame so as to enable relative angling between said second pair of rollers, said endless belt being wrapped about said second pair of rollers so as to define a reach therebetween, means for mounting at least one of said rollers of said second pair for movement longitudinally of the direction of movement of the belt so as to balance the sum of transverse components of tension forces acting on opposite sides of the longitudinal twist axis of the reach of belt between said second pair of rollers.

13. A belt angle station as defined in claim 6 wherein said adjustment means includes means supporting at least one of said rollers for movement in the direction of longitudinal movement of the corresponding ingoing or outgoing belt run while maintaining the longitudinal axis of said one of said rollers substantially transverse to the direction of movement of said corresponding belt run.

14. A belt guidance arrangement as defined in claim 12 including chute means spanning said first and second frames.

15. A belt guidance arrangement as claimed in claim 12 in which a lower one of each of said pairs of rollers is mounted on said first frame and an upper one of each of said pairs of rollers is mounted on said second frame.

16. A belt guidance arrangement as claimed in claim 12 in which an upper one of the first pair of said rollers and a lower one of the second pair of said rollers are mounted on one of said frames; and a lower one of the first pair of said rollers and an upper one of the second pair of said rollers are mounted on the other frame.

17. A belt guidance arrangement as defined in claim 12 in which a lower one of the first pair of said rollers and an upper one of the second pair of said rollers are mounted on one of said frames; and an upper one of the first pair of said rollers and a lower one of the second pair of said rollers are mounted on the other frame.

18. A belt guidance arrangement as defind in claim 12 in which said first and second pairs of rollers are mounted on said frames so as to lie in substantially overlapping relation in the belt vertical direction.

19. A belt guidance arrangement as claimed in claim 12 comprising a further frame swingable horizontally with respect to a selected one of said first and second frames and located at an end of said selected frame remote from the other of said first and second frames in the direction of belt travel, and a further set of first and second pairs of vertically spaced rollers, one roller of each of said further pairs of rollers being mounted on said selected frame and the other roller of each of the further pairs of rollers being mounted on said further frame, said belt being wrapped about and defining a reach between the rollers of each pair of said further set of first and second pairs of rollers, means for mounting at least one roller of each of said further pairs of rollers for adjustable movement longitudinally of the direction of movement of the belt to similarly balance the sum of transverse components of tension forces acting on opposite sides of the belt twist axis upon relative swinging movement between the rollers in each of said further pairs of rollers.

20. A belt guidance arrangement as claimed in claim 19 in which each roller of each pair of rollers is convex.

21. A belt guidance arrangement as claimed in claim 12 in which at least one of the rollers of each pair is convex.

22. A method of maintaining predetermined training of an elongated belt over a pair of substantially horizontally disposed rollers in a belt angle station, said method comprising the steps of; supporting said rollers in vertically spaced relation on first and second interconnected frames so as to enable said rollers to be selectively swingable generally horizontally relative to each other and adjustable longitudinally of the direction of movement of the belt, passing said belt about said rollers so as to define an ingoing run to one of said rollers and an outgoing run from the other of said rollers and further define a reach between said rollers which undergoes twisting generally about a longitudinal twist axis and is thereby subjected to transverse components of tension forces acting on opposite sides of said longitudinal twist axis which tend to urge said belt from a predetermined trained relation with said rollers upon horizontal swinging between said rollers, and selectively positioning said rollers relative to their respective frames in the longitudinal direction of belt movement so that the geometrical relation between the belt engaging peripheral surfaces of said rollers effects balancing of the sum of said transverse force components acting on opposite sides of said longitudinal twist axis of said belt and maintains said belt in predetermined trained relation with said rollers.

23. The method as defined in claim 22 wherein said step of selectively positioning said rollers comprises selectively varying the outer radial dimension of the belt engaging peripheral surface of at least one of said rollers.

24. The method as defined in claim 22 wherein said belt defines a substantially linear run ingoing to said one of said rollers and a substantially linear run outgoing from the other of said rollers, said step of selectively positioning said rollers comprising moving at least one of said rollers in the longitudinal direction of movement of the corresponding linear ingoing or outgoing belt run.

25. The method as defined in claim 24 wherein said step of positioning said rollers includes selectively moving each of said rollers in the longitudinal direction of belt movement of the corresponding ingoing or outgoing belt run.

26. The method as defined in claim 22 wherein at least one of said rollers includes a plurality of longitudinal segments defining the belt engaging peripheral surface of said roller, and means operatively associated with said segments in a manner to enable selective generally radial movement thereof relative to the longitudinal axis of the corresponding roller so as to vary the outer radial dimension of its belt engaging peripheral surface, said step of selectively positioning said rollers comprising selectively moving said longtudinal segments to positions wherein the geometrical relation between the outer peripheral surfaces of said rollers effects balancing of the sum of transverse components of tension forces acting on opposite sides of the longitudinal twist axis of said belt reach.

27. The method as defined in claim 22 including the steps of detecting transverse movement of the belt from said predetermined trained relation with said rollers, and positioning at least one of said rollers to adjust the geometrical relation between the belt engaging peripheral surfaces of said rollers in the longitudinal direction of belt movement so as to balance the sum of transverse components of tension forces acting on opposite sides of the longitudinal twist axis of the belt in response to detection of a predetermined transverse movement of said belt from said predetermined trained relation.

28. A belt angle station as defined in claim 13 wherein said roller adjustment enabling means comprises means enabling selective adjustment of the diameter of the belt engaging peripheral surface of said one of said rollers.

29. For use in a conveyor system such as employed in mining operations, a belt guidance arrangement comprising at least one pair of vertically spaced rollers, one of said rollers being mounted on a first frame and the other roller being mounted on a second frame swingable horizontally relative to said first frame, an endless belt wrapped about said pair of rollers so as to define a reach between said rollers which undergoes twisting generally about a longitudinal twist axis and is thereby subjected to transverse components of tension forces acting on opposite sides of said longitudinal twist axis upon horizontal swinging movement of said second frame relative to said first frame, means for detecting transverse movement of said belt from a generally centered position on said rollers, and means for effecting movement of at least one of said rollers longitudinally of the direction of belt movement so as to balance the sum of the transverse components of tension forces acting on opposite sides of said longitudinal twist axis and thereby maintain stable training of the belt about said rollers in response to detecting predetermined transverse movement of said belt.

30. A method of controlling tensile stress distribution in an elongated run of conveyor belt through a belt guidance arrangement which includes at least one pair of rollers having belt engaging peripheral surfaces of circular transverse cross section, said method comprising the steps of; supporting said rollers in vertically spaced substantially horizontal relation on first and second interconnected frames so as to enable horizontal swinging of said rollers relative to each other, said conveyor belt having individual longitudinal elements and defining an ingoing conveying run to one of said rollers and an outgoing conveying run from the other of said rollers and being wrapped about said rollers so as to define a reach therebetween which is twisted generally about a longitudinal twist axis and is thereby subjected to transverse components of tension forces acting on opposite sides of said longitudinal twist axis when said belt is turned through an angle by relative swinging between said rollers, positioning said rollers relative to their respective frames in the longitudinal direction of movement of the belt through at least one of said ingoing and outgoing runs such that the geometrical relation between the belt engaging peripheral surfaces of said rollers effects balancing of the sum of the transverse components of tension forces acting on opposite sides of said longitudinal twist axis resulting from relative swinging between the rollers, and forming the belt engaging peripheral surfaces of the rollers into profiled configurations which substantially equalize the path lengths of said individual longitudinal belt elements between contact with and release from said rollers on one side of said twist axis with the corresponding longitudinal belt elements on the opposite side of said twist axis and establish a predetermined differential in the path lengths from the longest to the shortest longitudinal elements of the belt so as to effect desired tensile stress distribution in the belt.

* * * * *

UNITED STATES PATENT AND TRADEMARK OFFICE
CERTIFICATE OF CORRECTION

PATENT NO. : 4,842,130

DATED : June 27, 1989

INVENTOR(S) : Dennis Mraz

It is certified that error appears in the above-identified patent and that said Letters Patent is hereby corrected as shown below:

Column 1, line 1, "continuation-in-art" should be --continuation-in-part--.

Column 1, line 49, "operation" should be --operations--.

Column 4, line 23, "2." should be --2,--.

Column 5, line 54, "or," should be --of,--.

Column 5, line 57, "6feet" should be --6 feet--.

Column 6, line 52, "preferbly" should be --preferably--.

Column 10, line 60, "arrangemnet" should be --arrangement--.

Signed and Sealed this

Twelfth Day of June, 1990

Attest:

HARRY F. MANBECK, JR.

*Attesting Officer*  *Commissioner of Patents and Trademarks*